US006604028B2

(12) United States Patent
Varon

(10) Patent No.: US 6,604,028 B2
(45) Date of Patent: Aug. 5, 2003

(54) VERTICAL MOTION DETECTOR FOR AIR TRAFFIC CONTROL

(75) Inventor: Dan Varon, Needham, MA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 10/016,617

(22) Filed: Oct. 30, 2001

(65) Prior Publication Data

US 2003/0060945 A1 Mar. 27, 2003

Related U.S. Application Data

(60) Provisional application No. 60/325,042, filed on Sep. 26, 2001.

(51) Int. Cl.$^7$ .............................. G01S 13/91; G05D 1/06
(52) U.S. Cl. ........................... 701/4; 701/120; 701/223; 342/36; 342/38
(58) Field of Search ............................... 701/4, 7, 8, 9, 701/10, 14, 120, 121, 300, 301, 223; 342/36, 37, 38; 340/967, 970, 973, 974, 977; 348/117, 143

(56) References Cited

U.S. PATENT DOCUMENTS

| | | | | |
|---|---|---|---|---|
| 4,910,526 A | | 3/1990 | Donnangelo et al. ....... 342/455 |
| 5,202,684 A | | 4/1993 | Funatsu ...................... 340/961 |
| 5,317,316 A | * | 5/1994 | Sturm et al. ................... 342/30 |
| 5,627,546 A | * | 5/1997 | Crow ......................... 342/352 |
| 6,262,679 B1 | * | 7/2001 | Tran ............................. 342/29 |

FOREIGN PATENT DOCUMENTS

EP 0926511 A2 * 6/1999 ........... G01S/13/91

OTHER PUBLICATIONS

Bloom, Henk A.P. and Bar–Shalom, Yaakov, "The Interacting Multiple Model Algorithm for Systems with Markovian Switching Coefficients," Aug. 1998, IEEE Transactions on Auto, C Control, vol. 33, No. 8, pp. 780–783.

Varon,, Dan, "New Advances in Air Traffic Control Tracking of Aircraft," Oct.–Dec. 1994.

Blom, H.A.P., "An Efficient Filter for Abruptly Changing Systems," IEEE, Proceedings of 23nd Conference on Decision and Control, Las Vegas, NV, Dec. 1984, pp. 656–658.

PCT Search Report dated Mar. 5, 2003; issued with regard to PCT Application Number PCT/US02/30406, filed on Sep. 25, 2002.

Sviestins et al., "Nonlinear Technologies for Mode C Climb/ Descent Rate Estimation in ATC Systems;" *IEEE Transactions on Control Sysmtems Technology* Vol. 9, No. 1, Jan. 2001; 1063–6536/10; XP–001146005, pp. 163–174.

Yeddanapudi et al; "IMM Estimation for Multitarget Air Traffic Surveillance;" Preceedings of the 34*th Conference on Decision & Control, New Orleans, LA, Dec. 1995*, TP17 5:20; IEEE; 0–7803–2685–7/95; pp. 2778–2783.

* cited by examiner

*Primary Examiner*—Tan Q. Nguyen
(74) *Attorney, Agent, or Firm*—Daly, Crowley & Mofford, LLP

(57) ABSTRACT

A process and apparatus are disclosed for estimating changes in the vertical mode of flight of an aircraft. The process and apparatus utilize a vertical motion detection method (VMD) and a modified altitude post processor logic to reduce the time delay for determination of vertical mode of flight changes.

30 Claims, 6 Drawing Sheets

VERTICAL MOTION DETECTOR FOR AIR TRAFFIC CONTROL

RELATED APPLICATIONS

This application claims the benefit of U.S. Provisional Application No. 60/325,042, filed on Sep. 26, 2001 which application is hereby incorporated herein by reference in its entirety.

GOVERNMENT RIGHTS

This invention was made with government support under Contract No. DTFA01-96-D-03008 awarded by the F.A.A. The government has certain rights in the invention.

FIELD OF THE INVENTION

This invention relates generally to air traffic control systems and more particularly to a method and apparatus for determining the beginning and end of a change of aircraft vertical mode of flight.

BACKGROUND OF THE INVENTION

As is known in the art, air traffic control (ATC) systems promote the safe, orderly and expeditious flow of aircraft traffic. Safety is principally a matter of preventing collisions with other aircraft, obstructions, and the ground, assisting aircraft in avoiding hazardous weather, assuring that aircraft do not operate in airspace where operations are prohibited, and assisting aircraft in distress.

As is also known, ATC systems employ information from both ground based radar and aircraft based transponders to indicate the horizontal and vertical position of one or more aircraft. Aircraft can include a so-called mode C transponder. The aircraft based Mode C transponder, upon interrogation by an ATC system, transmits information to the ATC about the altitude of the aircraft. The altitude determining method of existing ATC systems uses both Mode C data from the aircraft transponder as well as information from a multi-radar tracker (MRT) process. Data from the Mode C transponder and from the MRT are processed by an altitude post processor (APP) method that further enhances the vertical mode of flight (MOF) determination, the determination being that of level or non-level flight.

Existing Mode C data has a resolution of 100 feet, due in part to low resolution of the received Mode C transponder data combined with further limitation of the existing APP processing method. The 100 foot resolution resembles a step function with 100 foot reported altitude jumps as the altitude crosses resolution boundaries. This resolution limit and finite altitude jumps result in both a delay time in the determination of the start or stop of an aircraft altitude change and a relatively high level of uncertainty as to the instantaneous aircraft rate of ascent or decent.

Due to the 100 foot altitude uncertainty, it is necessary to set a minimum limit of 200 feet before an altitude change can be reported by the conventional APP method. It is also necessary to delay altitude change determinations so as to filter out the instantaneous 100 foot uncertainty. Data with this uncertainty is presented to existing Conflict Alert (CA) and Minimum Safe Altitude Warning (MSAW) systems, which are utilized in existing ATC systems. The altitude determination time delay and the altitude uncertainty cause the CA and the (MSAW) systems to miss some real aircraft position conflicts and also to falsely declare some such conflicts. The safety of aircraft monitored by such ATC systems is thereby compromised.

The conventional APP method indicates a change from level to non-level mode of flight (ascending or descending) if all of the following conditions are true: (1) the altitude rate received from the MRT is non-zero and the previous altitude rate computed by the APP was zero; (2) the difference between the current and reference altitude is greater than 100 feet and the difference between their times is at least 3 seconds; and (3) the initial altitude rate, set to ninety percent of the reference speed below, is greater than two hundred feet per minute, where:

reference speed=(altitude reported by Mode C−reference altitude)divided by(altitude report time−reference altitude time).

It should be noted that the reference altitude is set at the time the aircraft is first detected and it remains fixed until a non-level flight condition is declared or 65 seconds have elapsed, whichever occurs first, at which time the reference altitude is reset to the current altitude. The reason for this is that if the vertical speed of the aircraft is slow (e.g. 200 ft/min), the vertical distance moved per radar scan (e.g. 5 seconds) is less than 100 ft. Therefore, one needs a reference altitude with which future altitude reports are compared to discern a difference of at least 200 ft. considering the fact that 100-ft. scan-to-scan differences do not indicate vertical motion.

The conventional APP method indicates a change to a level flight track if all of the following conditions are true: (1) the altitude rate received from the MRT is less than or equal to $10^{-6}$ nautical miles per second; (2) the level altitude reference (LAR) has not been updated for at least the last sixty five seconds. The LAR is a reference altitude that is used to determine when an aircraft resumes level flight. If the vertical speed is slow, it is not possible to determine from scan-to-scan when vertical motion ceases, again because of the 100-ft uncertainty. The LAR is not updated as long as the reported altitude does not change by more than 100 ft. If this condition persists for at least 65 seconds, it constitutes one of the necessary conditions for declaring level flight.

The performance of the aircraft trackers associated with present ATC systems is limited in vertical MOF determination accuracy by the 100 foot resolution and the noisy output nature of the altitude data presented by the Mode C transponder. Due in part to the low quality of this data, trackers have relatively long time delays in their ability to estimate or otherwise determine a change of vertical MOF. A large time delay in the determination of a change of aircraft vertical motion causes the ATC to require large aircraft separations via existing Conflict Alert (CA) methods. Such relatively long time delays can compromise aircraft safety as airspace become increasingly crowded.

It would therefore be desirable to provide a system which more rapidly estimates or otherwise determines the time at which an aircraft mode of flight changes from level to non-level and vise-versa.

SUMMARY OF THE INVENTION

In accordance with the present invention, a method for determining when a moving object's vertical mode of flight changes between level and non-level includes calculating a vertical motion indicator (VMI) value that indicates that the moving object's vertical mode of flight is either level or non-level, and utilizing the VMI value to initiate and terminate vertical-motion tracks.

With this particular arrangement, the VMI value gives improved vertical mode of flight (MOF) determination accuracy and a more rapid determination of the time of a change in vertical MOF. The method can further include utilizing the VMI value in a modified APP method by providing the VMI value to a processor, providing multi-radar tracking data to the processor, providing altimeter altitude data values to the processor, and processing these three values in the processor to track the moving object's vertical MOF. The combination of the three data inputs to the modified APP method gives a more accurate and more rapid determination of the altitude and the vertical mode of flight.

In accordance with another aspect of this invention, an apparatus for tracking when a moving object's vertical mode of flight changes between level and non-level, includes a vertical motion detector (VMD) processor that computes a vertical motion indicator (VMI) value. The VMI value indicates that the moving object's vertical mode of flight is either level or non-level. The apparatus also includes a flight mode processor that utilizes the VMI value to estimate the moving object's vertical mode of flight.

With this particular arrangement, the VMD processor provides a VMI value that gives improved MOF determination accuracy to yield a more rapid determination of the vertical mode of flight. In one embodiment, the apparatus can include the flight mode processor that includes a non-level mode processor and a level mode processor. The non-level mode processor utilizes the VMI value, multi-radar tracking data, and altimeter altitude data to determine or otherwise estimate a non-level mode of flight of the moving object. The level mode processor utilizes the VMI value, the multi-radar tracking data, and the altimeter altitude data to determine or otherwise estimate a level mode of flight of the moving object. The modified APP method is implemented by the non-level mode processor and the level mode processor. The non-level mode processor can rapidly determine or otherwise estimate a change from level to non-level flight, such information being used to avoid aircraft position conflicts. The level mode processor can determine when the aircraft changes from non-level to level flight, avoiding other aircraft conflicts.

DETAILED DESCRIPTION OF THE INVENTION

Before describing the air traffic control system of the present invention some introductory concepts and terminology are explained. The term "maneuver" or "maneuvering" is used herein to describe a flight path or a movement of an aircraft or other target. In particular, a target is "maneuvering" or undergoing a "maneuver" any time the target changes horizontal speed in any dimension. It should be noted that velocity is defined by a speed and a direction. Thus, a target may be maneuvering even when moving along a straight path. The term "mode of flight" (MOF) is used herein to describe a flight path that is either level or non-level. A change in MOF can either be done with or without change in velocity, and with or without a change in horizontal direction. A MOF change indicates a change in altitude.

It should also be appreciated that the present invention relates to apparatus and techniques for estimating when a moving object's vertical MOF changes between level and non-level. In one exemplary embodiment described herein, the apparatus and techniques process Mode C data having a particular quantization (e.g. Mode C data with 100-ft. quantization). It should be understood, however, that Mode C data with 100-ft. quantization is but one source of data. The apparatus and techniques described herein are not limited to use of Mode C data. The examples provided herein are intended to facilitate explanation and understanding of the invention and are not intended to be limiting, It should be understood that the apparatus and techniques described herein can also operate with altitude data having a variety of different quantizations (e.g., 25 ft.) and that such altitude data may be provided from a variety of different sources including but not limited to a GPS source. In still other embodiments, a combination of sources may be used (e.g. both a GPS source and a Mode C source may be used).

Figure 1:
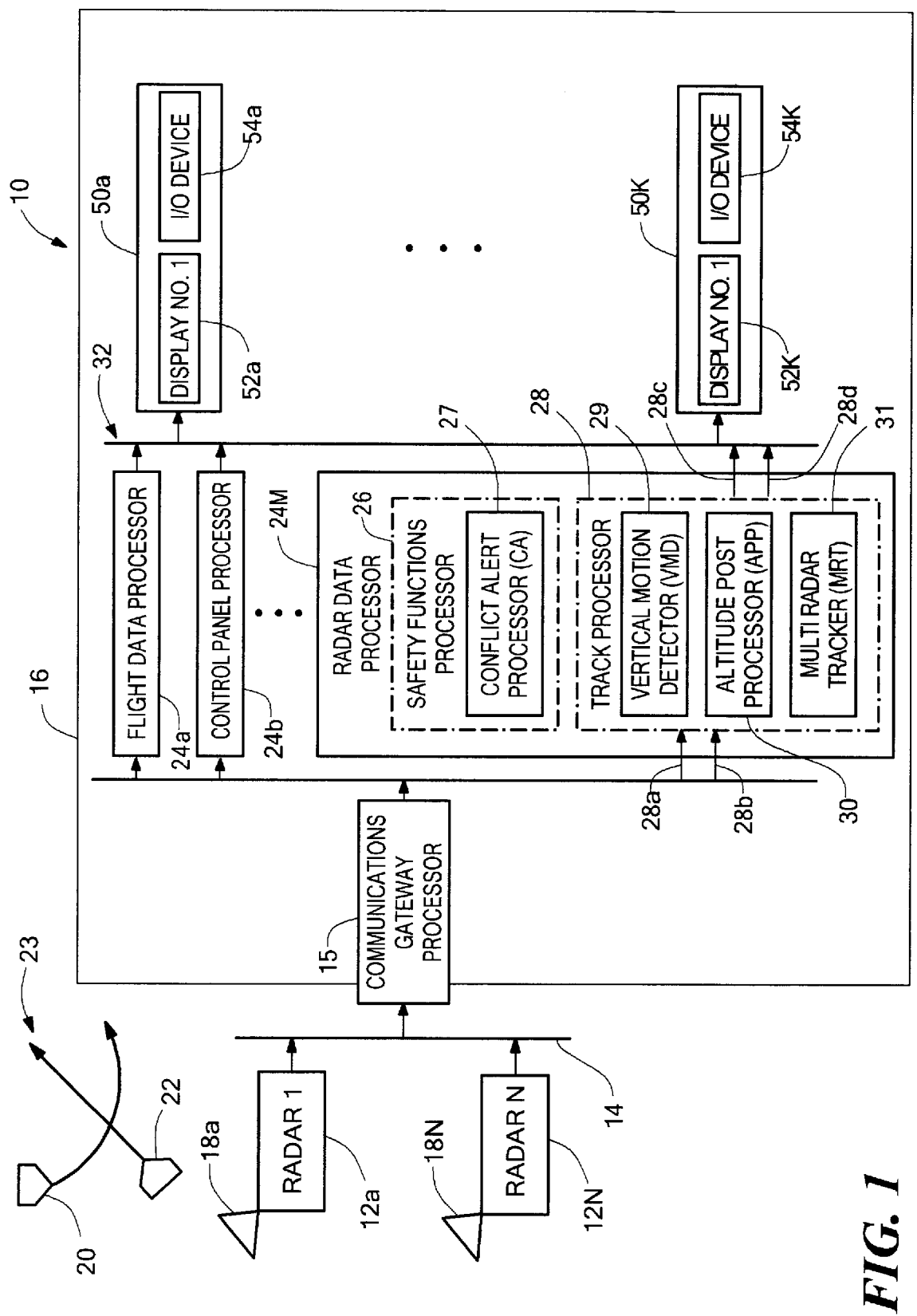
FIG. 1 is a block diagram of an air traffic control (ATC) system.

Referring now to FIG. 1, in general overview, an air traffic control (ATC) system 10 is shown to include one or more radar systems 12a–12N generally denoted 12 coupled via a network 14 which may be provided for example, as a local area network, and a communications gateway processor 15 to an air traffic control automation (ATCA) system 16. In the case where multiple radar systems 12 exist, each of the radar systems 12 may be located at different physical locations to provide substantially continuous radar coverage over a geographic area larger than that which could be covered by any single one of the radar systems 12.

In operation, each of the radar systems 12 emits radio frequency (RF) signals into a predetermined spatial region through a corresponding one of antennas 18a–18N as is generally known. Portions of the emitted RF signals intercept targets 20, 22 which may correspond, for example, to aircraft flying in the predetermined spatial region. Those portions of the emitted RF signals which intercept the targets 20, 22 are reflected from the targets 20, 22 as return or target signals which are received by respective ones of the radars 12.

In some cases each of the targets 20, 22 includes a transponder, and the RF signal emitted by the radar system 12 includes a so-called interrogation signal. The interrogation signal interrogates the transponder on the target 20, 22 and in response to an appropriate interrogation signal, the transponder transmits the response signal from the target 20, 22 to the respective radar system 12. Thus, first portions of the return or target signal received by the respective ones of the radars 12 may correspond to portions of the RF signal reflected from the targets 20, 22 and second portions of the target signal can correspond to a response signal emitted from the transponder on the target. Of particular interest herein, the transponder response signal includes Mode C altimeter information which describes the altitude of the aircraft in digital numerical format.

Each of the one or more radar systems 12 feeds the target data signals through the communications gateway processor 15 to the ATCA system 16. The ATCA system 16 includes one or more processors 24a–24M each of which perform a particular function. Here ATCA system 16 is shown to include a flight data processor 24a for processing flight-plan data submitted by aircraft personnel to designate routes, a control panel processor 24b to provide appropriately processed information to be displayed on one or more displays 52a–52K, and a radar data processor 24M which processes target data signals in a particular manner to be described below. The radar data processor 24M includes a safety functions processor 26 that in turn includes a conflict alert (CA) processor 27. The radar processor 24M also includes a track processor 28 that in turn includes a multi-radar tracker (MRT) 31, a vertical motion detector (VMD) 29, and an altitude post processor (APP) 30.

Those of ordinary skill in the art will appreciate of course that ATCA system 16 may include additional or fewer processors depending upon the particular application. For example, in some embodiments it may be desirable to utilize a single processor which concurrently or simultaneously performs all the functions to be performed by ATCA system 16.

The processors 24 are coupled over a network 32 to the one or more input/output (I/O) systems 50a–50K generally denoted 50. Taking I/O system 50a as representative of systems 50b–50K, each I/O system 50 includes a processor and any other hardware and software necessary to provide a graphical user interface (GUI). Each I/O system includes a display 52a which can have coupled thereto an input device 54a which may be provided, for example, as a keyboard and a pointing device well known to those of ordinary skill in the art, which interfaces with the graphical user interface (GUI) of the display 52a. Those of ordinary skill in the art will appreciate, of course, that other input devices may also be used. The displays 52 may be located at different physical locations.

Among other things, the ATCA system 16 maintains and updates the target data fed thereto to thus maintain the location and speed of targets detected and tracked by the radar system portion of the air traffic control system. In performing this function, the ATCA system typically assigns a unique identifier or "label" to each tracked target.

Air traffic control system 10 generates via the CA processor 27, from time to time, alerts which indicate that one or more targets may become or are physically closer than an allowed minimum separation standard (MSS). If the targets are maneuvering, then in accordance with the present invention, a prediction or determination of whether a violation of the separation standards will occur can be made. The situation where aircraft are maneuvering in proximity may occur at any time during a flight but may occur more commonly around aircraft take-off and landing sites, e.g. airports and terminal radar approach control (TRACON) areas.

Air traffic control system 10 tracks a plurality of targets with two targets 20, 22 here being shown for simplicity and ease of description. The two targets 20, 22 flying in proximity to each other form a target pair 23. At least one of the two aircraft in target pair 23 are maneuvering thereby preventing the reliable prediction or determination of a violation of air separation standards using conventional techniques. In this case, the processing steps executed by the conflict alert (CA) processor 27 provides a reliable prediction of MSS violations.

The CA processor 27 computes a composite flight path for the targets 20, 22 and predicts violations of aircraft minimum separation standards (MSS) in cases where the aircraft maneuver dynamics are unknown. The MSS has both a horizontal and a vertical component.

Because the tracking function of conventional ATC systems do not estimate accelerations and turn rates with sufficient accuracy, it is not possible to predict horizontal and vertical conflicts between maneuvering aircraft with the same accuracy as it is for non-maneuvering ones. In the embodiment of this invention, the tracking accuracy is enhanced by improvements to the track processor 28. Improvements to the track processor will be described in association with subsequent figures.

Generally, random altimeter altitude measurement errors in the Mode C transponder data, compounded by 100 foot quantization resolution in the transponder data path from the aircraft to the radar, can cause the altimeter reports from an actual level fight to toggle between two values which are 100 feet apart. This noisy data results in an inaccurate determination of the aircraft's actual motion. The 100 foot resolution also causes 100 foot reported altitude jumps as the real altitude crosses resolution boundaries. This accuracy limitation and the finite altitude jumps, result in both a delay time in the determination of the start or stop of an aircraft altitude change, and a high level of uncertainty as to the instantaneous aircraft rate of ascent or decent.

Figure 2:
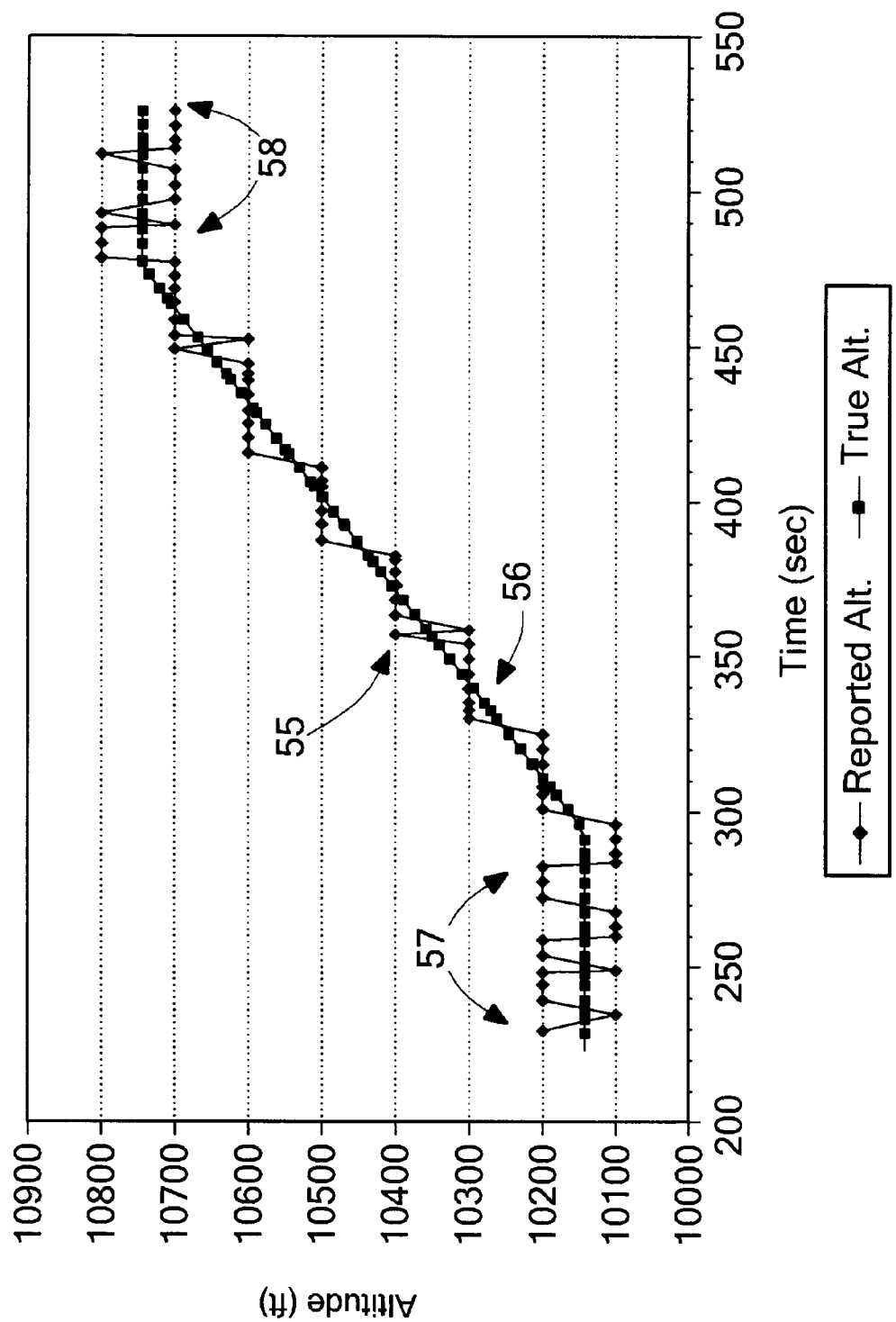
FIG. 2 is a plot of actual altitude and Mode C transponder reported altitude versus time.

Referring now to FIG. 2, a plot of aircraft altitude in feet (ft) versus time in seconds (sec) is shown. The non-smooth curve 55 is Mode C transponder data of an aircraft as it traverses from 10,150 feet to 10,750 feet altitude. The smooth curve 56 is the actual altitude of the aircraft. As can be seen from curve 55, the mode C data shows 100 foot increments. It should be appreciated that the curve 55 shows 100 foot jumps even where the aircraft is in level mode of flight at the beginning 57 and end 58 of the track.

Due to the 100 foot uncertainty, the MRT that conventionally receives the mode C data, is unable to predict level fight by itself.

Figure 3:
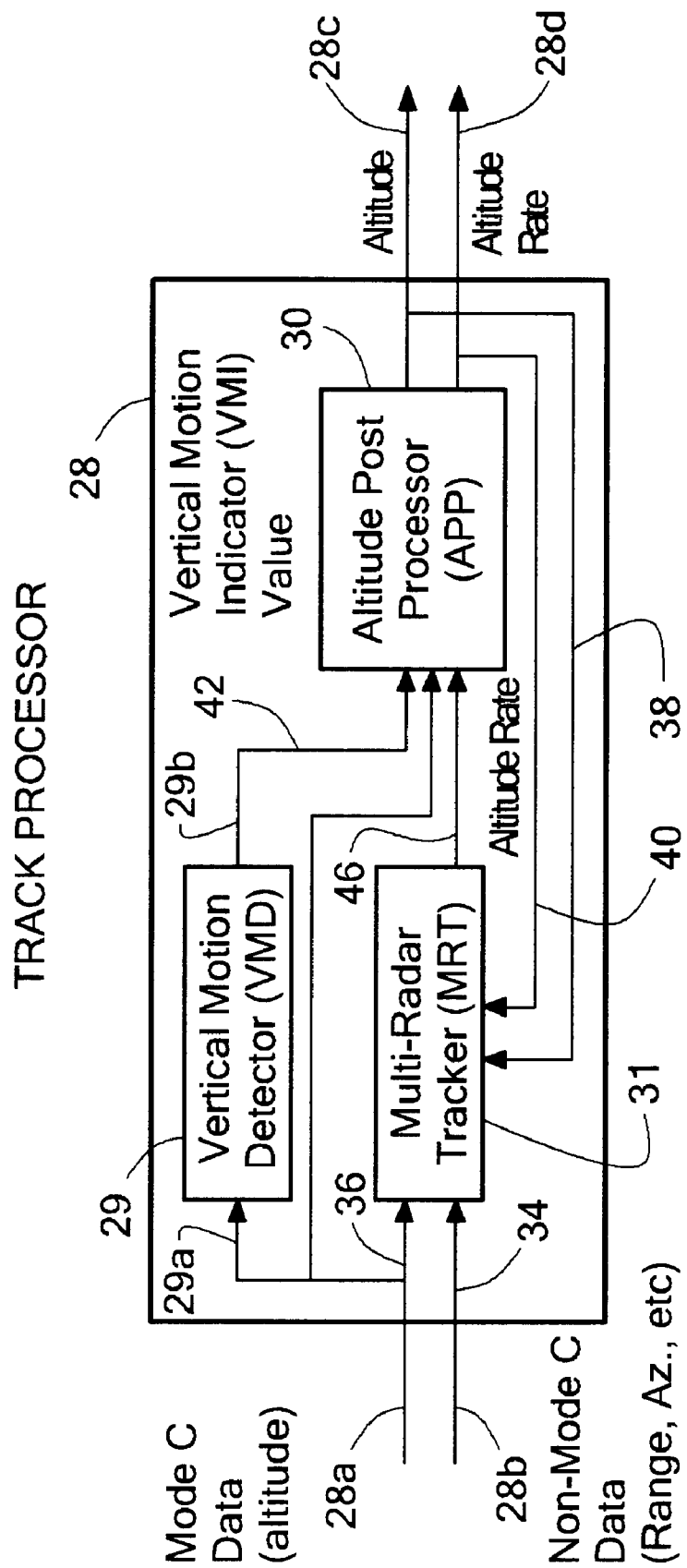
FIG. 3 is a block diagram of a track processor.

Referring now to FIG. 3, a track processor 28, having inputs 28a, 28b and outputs 28c, 28d includes a vertical motion detector (VMD) 29 having an input 29a at which mode C data 36 is received. An output 29b is coupled to a modified Altitude Post Processor (APP) 30. Track processor 28 also includes a conventional multi-radar tracker (MRT) 31.

Radar data 34 and Mode C altitude transponder data 36 are provided to the MRT 31. Mode C altitude transponder data 36 is also presented to the VMD 29. The VMD 29 processes the Mode C altitude data 36 in a manner to be described below in conjunction with FIG. 4 and produces vertical motion indicator (VMI) output value 42 at port 29b. In one embodiment, the VMI output value 42 can be one of two values. In the present invention, the VMI value 42 is provided to APP processor 30. The APP processor 30 thus operates upon three inputs, Mode C altitude transponder data 36, the VMI value 42 and an altitude rate value 46 to produce an indication of the commencement of a change in vertical mode of flight, either from level to non-level, or from non-level to level.

It should be appreciated that in a conventional track processor, only two inputs (Mode C data 36 and altitude rate 46) are presented to the APP 30.

As mentioned above, the VMD 29 provides a VMI output value 42 to the APP 30 and the VMI output value 42 indicates a probability of level or non-level flight and is used in conjunction with the APP processor 30 to provide a more rapid indication of change in mode of flight (MOF) either from level to non-level or from non-level to level.

Figure 4:
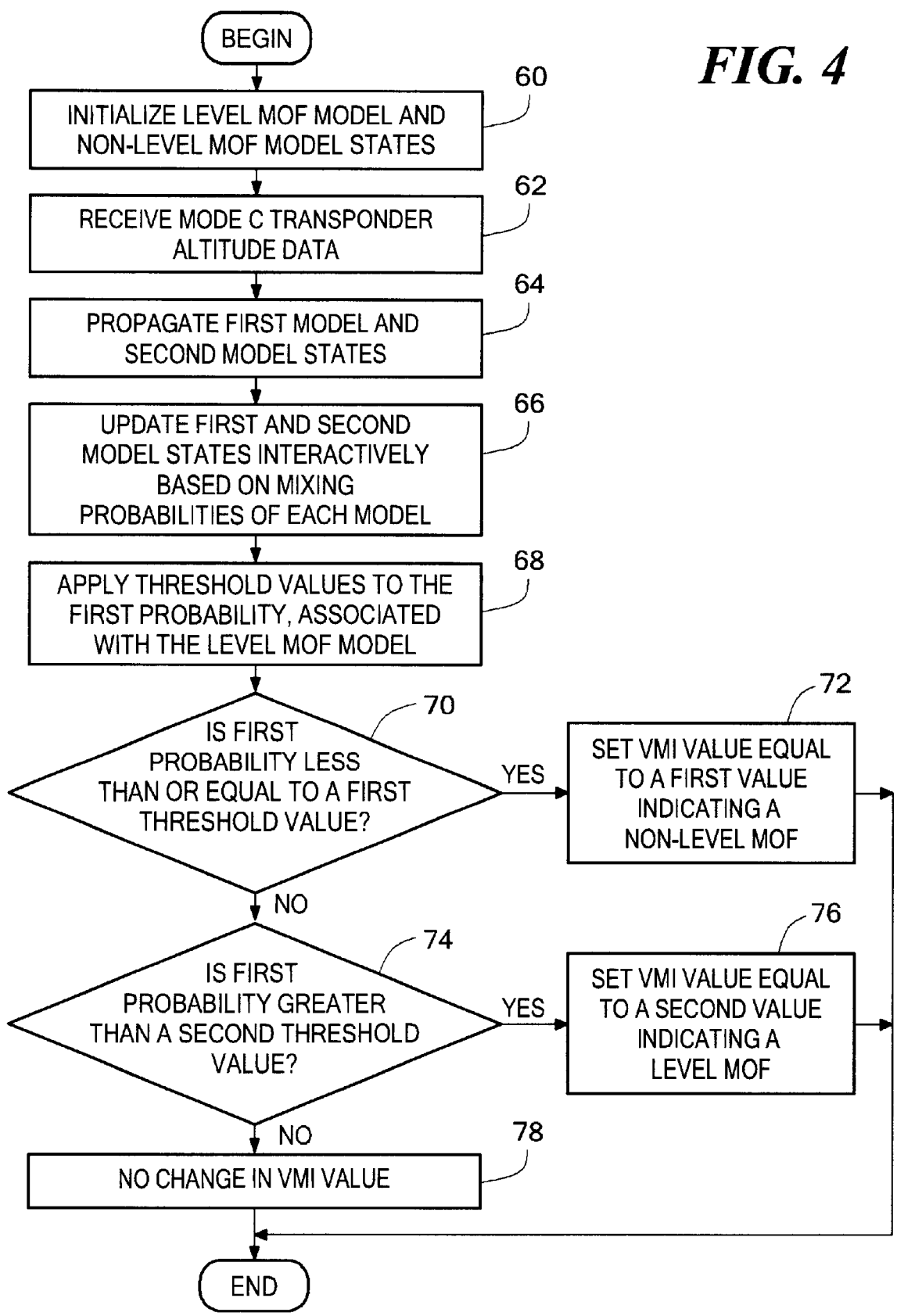
FIG. 4 is a flow diagram of a process for producing a vertical motion indicator (VMI) value.
Figure 5:
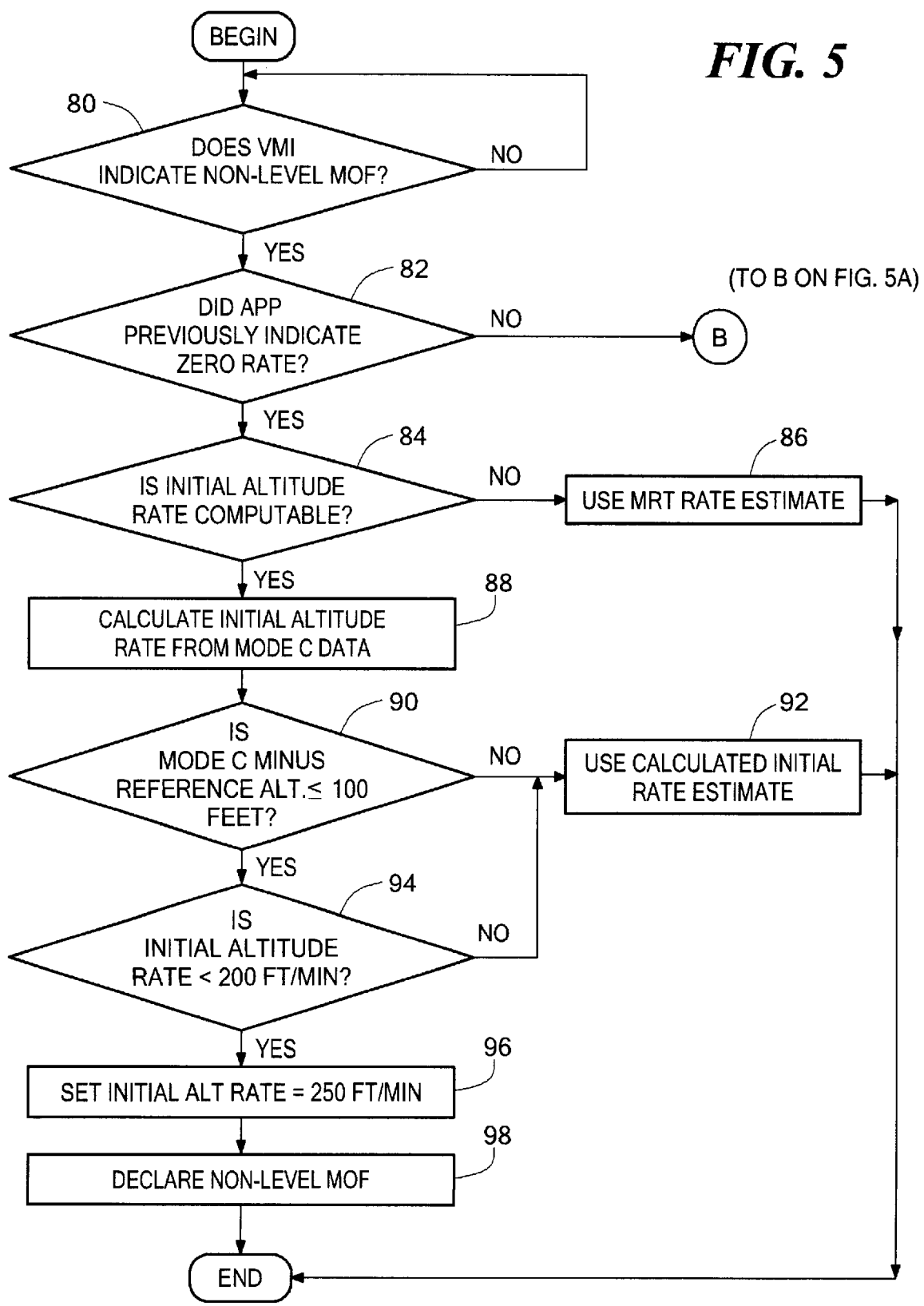
FIGS. 5 and 5A are a series of flow diagrams illustrating a modified APP method for determining a change in vertical mode of flight that uses the VMI value.
Figure 5A:
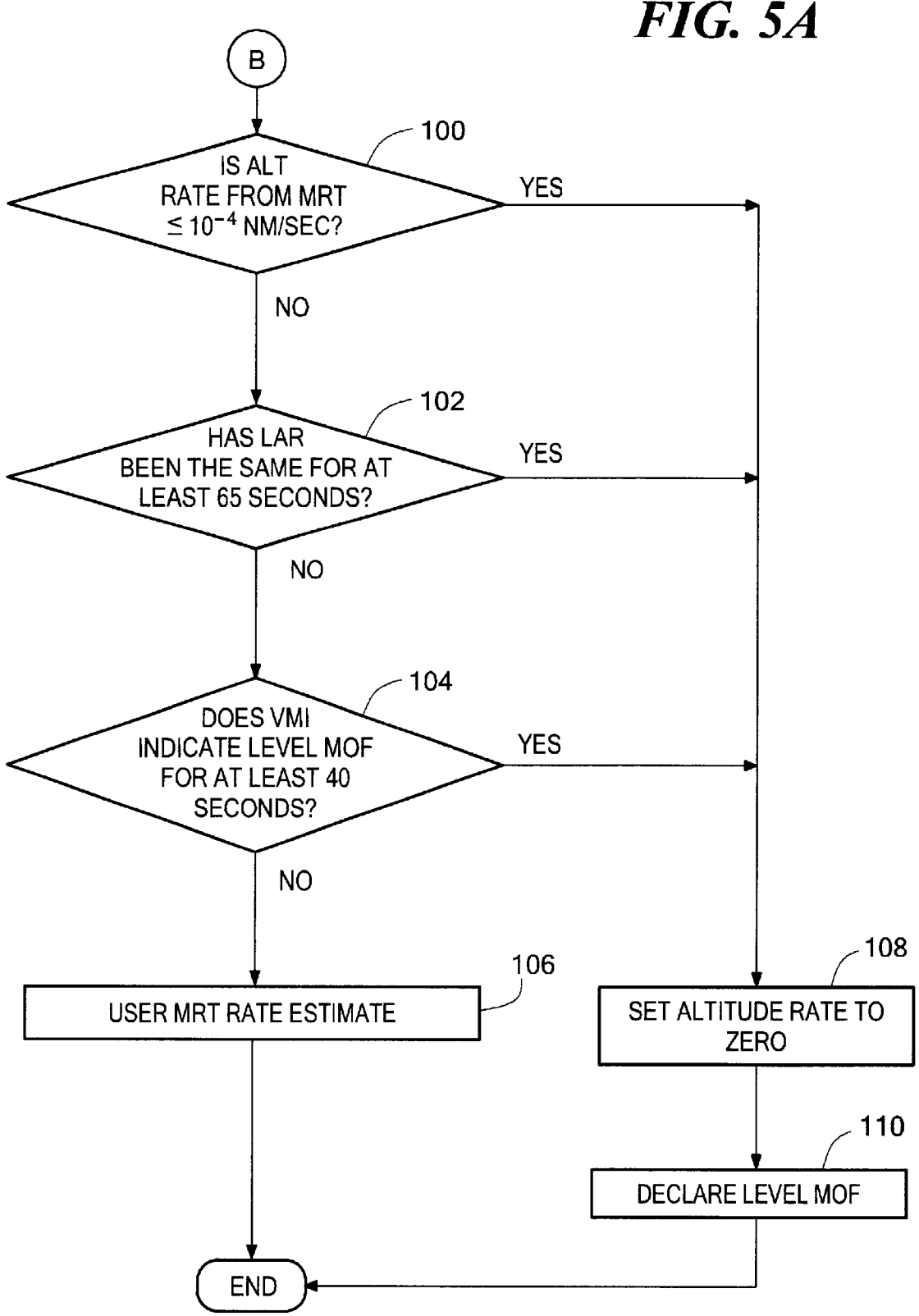

FIGS. 4, 5 and 5A are a series of flow diagrams showing the processing for determining when a moving object's vertical mode of flight changes between level and non-level. The rectangular elements (typified by element 60 in FIG. 4), are herein denoted "processing blocks" and represent computer software instructions or groups of instructions. The diamond shaped elements (typified by element 70 in FIG. 4), are herein denoted "decision blocks" and represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention.

Referring now to FIG. 4, a flow diagram of the processing that takes place in the VMD 29 (FIG. 3) to produce the VMI value 42 (FIG. 3) is shown.

The processing to be described below pertains to a VMD which utilizes two MOF models. A first model is associated with an estimate of level mode of flight and a second model is associated with an estimate of a non-level mode of flight.

The first is a model provided from a first Kalman filter that outputs a first state vector, a first covariance matrix, and a first probability value. The values of the state vector, first covariance matrix and first probability value collectively define a first model state. The first probability value indicates the probability that the first model matches the target's mode of flight. Further, the first state vector contains an altitude value and a first altitude rate value.

The second MOF model is provided from a second Kalman filter that outputs a second state vector, a second covariance matrix, and a second probability. These values collectively define a second model state. The second probability value indicates the probability that the second model matches the target's mode of flight. Further, the second state vector contains the altitude value and a second altitude rate value that is generally non-zero.

Processing begins in step 60 in which the second models are provided with initial values. The altitude rate value of the first model is typically set to zero while the altitude rate value of the second model is typically set to a non-zero value.

Each of the two Kalman filters comprising the VMD is estimating a two-dimensional state vector (SV), composed of altitude and altitude rate, and a two-by-two covariance matrix. The initial SV of the level-flight filter (LFF) (i.e. the first MOF model) comprises the reported Mode C altitude and zero altitude-rate:

$$X_1(2) = \begin{bmatrix} x_1(2) \\ \dot{x}_1(2) \end{bmatrix} = \begin{bmatrix} Z(2) \\ 0 \end{bmatrix}$$

where •(2) is the value of • at time $t_2$—the time of the second measurement—and Z is the reported, Mode C altitude. The initial SV of the non-level-flight filter (NLFF) (i.e. the second MOF model) comprises the reported altitude and an initial altitude rate:

$$X_2(2) = \begin{bmatrix} x_2(2) \\ \dot{x}_2(2) \end{bmatrix}$$

where $x_2(2)=Z(2)$, $$\dot{x}_2(2) = \frac{Z(2) - Z(1)}{t_2 - t_1},$$

and Z(1) is the value of Z at time $t_1$ (i.e., the time of the first measurement).

If $Z(1)=Z(2)$, $\dot{x}_2(2)$ is set to 200 ft/minute. The initial covariance matrix of each filter is:

$$P_j = \begin{bmatrix} \sigma_s^2 & \sigma_s^2/\tau_2 \\ \sigma_s^2/\tau_2 & 2\sigma_s^2/\tau_2^2 \end{bmatrix}$$

where j=1 denotes the LFF, j=2 denotes the NLFF, $\sigma_s$ is the altitude measurement standard deviation that includes the quantization, and $\tau_2=t_2-t_1$. The initial model probabilities are set to $\mu_1(2)=0.99$ and $\mu_2(2)=0.01$. At times $t_k$, k=3,4, . . . , upon receipt of measurement Z(k), the SVs of the two filters are propagated as follows:

$$X_1(k-1|k) = \begin{bmatrix} x_1(k-1|k-1) \\ 0 \end{bmatrix}$$

$$X_2(k-1|k) = \begin{bmatrix} x_2(k-1|k-1) + \dot{x}_2(k-1|k-1) \cdot (t_k - t_{k-1}) \\ \dot{x}_2(k-1|k-1) \end{bmatrix}$$

where •(m|n) is the estimate of • at time $t_n$ based on measurements up to and including time $t_m$. Thus, $X_j(k-1|k)$ is the propagated (predicted) SV and $X_j(k-1|k-1)$ is the last-updated (smoothed) SV of Filter j. The propagated covariance matrix $M_j(k)$ is:

$$M_j(k)=\Phi_j(k)P_j(k-1)\Phi_j^T(k)+\Gamma(k)Q_j\Gamma^T(k)$$

where $\Phi_j(k)$ is the transition matrix at time $t_k$, $\Gamma(k)$ is the process noise transition matrix, and $Q_j=\sigma_{aj}^2$ is the variance of the process noise:

$$\Phi_1(k) = \begin{bmatrix} 1 & 0 \\ 0 & 1 \end{bmatrix} \quad \Phi_2(k) = \begin{bmatrix} 1 & \tau_k \\ 0 & 1 \end{bmatrix} \quad \Gamma_k = \begin{bmatrix} \tau_k^2/2 \\ \tau_k \end{bmatrix} \quad \tau_k = t_k - t_{k-1}$$

The residuals and residual covariances of the two filters are:

$$\tilde{Z}_j(k)=Z(k)-X_j(k-1|k)$$

and $$S_j(k)=HM_jH^T+\sigma_s^2$$

respectively, and H=[1 0].

The likelihood functions $\Lambda_j$ and model probabilities $\mu_j$ are:

$$\Lambda_j(k) = \frac{1}{\sqrt{(2\pi)^3 S_j(k)}} \exp\left(-\tilde{Z}_j^2(k)/2S_j(k)\right)$$

$$\mu_j(k) = \frac{1}{c}\Lambda_j(k)\sum_{m=1}^{2} p_{mj}\mu_m(k-1)$$

-continued $$c = \sum_{j=1}^{2} \Lambda_j(k) \sum_{m=1}^{2} p_{mj}\mu_m(k-1)$$

where $p_{mj}$ are elements of a two-by-two probability transition matrix with $p_{11}=p_{22}=0.99$, and $p_{12}=p_{21}=0.01$. Note that $\mu_1$ is the level-flight probability, $\mu_2$ is the non-level-flight probability, and $\mu_2=1-\mu_1$. The VMD provides the value of $\mu_1$ to the APP.

In addition to updating the model probabilities, each filter updates its state vector and covariance matrix, after which the filters "exchange information" via a process called mixing that produces the input state vector and covariance matrix for the next update cycle of the VMD. The cycle is completed by an averaging step, which calculates a weighted average of the SVs of the two filters, with the model probabilities as weights:

$$X_a(k)=\mu_1(k)X_1(k)+\mu_2(k)X_2(k)$$

It should be noted that the updating, mixing, and averaging steps described above are part of the conventional Interacting Multiple Model (IMM) Algorithm, as described, for example, in Varon, D. "New Advances in Air Traffic Control Tracking of Aircraft." Journal of Air Traffic Control, October–December 1994.

In accordance with the present invention, however, a level-flight filter is used with an identity transition matrix ($\Phi_1(k)=I$). The predicted altitude is equal to the altitude last calculated by the APP and the altitude rate is reset to zero.

VMD simulations have shown that the first probability, for the level MOF model, can be initialized to 0.99, while the second probability for the non-level MOF model, can be initialized to 0.01. These initial values allow the VMD to produce an output which estimates the actual track of an aircraft sufficiently rapidly. It should be noted, however, that other initial values may also be used. In general, in any particular application, the particular initial values to use may be selected using empirical techniques. Appropriate initial values are any values which allow the VMD to produce an output which estimates the actual track of an aircraft sufficiently rapidly.

After the initialization is complete, processing proceeds to step 62 in which the VMD receives Mode C transponder altitude data at time intervals of approximately 5 to 12 seconds. It should be noted that in the case where data is received from multiple radars with overlapping coverage, the time can be less than five seconds. With each new Mode C data, the first and second model states are computed as shown in step 64. The first and second Kalman filters produce new first and second state vectors, new first and second covariance matrices and new first and second probabilities.

The model states are then updated by an interactive process as shown in step 66. The first and second state vectors and the first and second covariance matrices are proportionally adjusted using as factors a set of mixing probabilities that are computed from the first and second updated model probabilities. One of ordinary skill in the art will recognize this interactive process as one used by the aforementioned IMM algorithm. Thus, the model that indicates the higher probability of matching the target's MOF is used to proportionally update the model with the lower probability, in a proportion related to the ratio of the mixing probability values. At the end of the update process 66, the altitude rate of the first state vector is always reset to zero to sustain the assumption that the first Kalman Filter is modeling a level-flight MOF.

In step 68, threshold values are applied to the first probability value associated with the first MOF model. Processing then proceeds to step 70 where a decision is made as to whether the first probability value is less than or equal to a first threshold value. If the first probability is less than or equal to a first threshold value, then processing proceeds to step 72 where the VMI value is set to a first value indicating a non-level MOF. Processing then ends. If on the other hand the first probability value is greater than the first threshold value then processing proceeds to decision block 76 in which a decision is made as to whether the first probability is greater than our equal to a second threshold value. If in decision block 74, a decision is made to that the first probability is greater than the second threshold value, then processing proceeds to step 76 in which the VMI value is set equal to a second value indicating a level MOF. Processing then ends.

If, on the other hand, in decision block 74 a decision is made that the first probability value is less than or equal to the second threshold value, then processing proceeds to step 78 in which no change is made in the VMI value. Processing ends.

Thus, when neither of the above conditions in steps 70 or 74 are met, the VMI value is unchanged. It should be noted that where the first probability is initialized to 0.99 as mentioned above, the VMI initial value indicates a level MOF.

VMD simulations have shown that first threshold values of 0.1 or ten percent, and second threshold values of 0.5 or fifty percent are desirable. These values result in a VMI value that rapidly predicts a change in MOF. It will be recognized by one of ordinary skill in the art that other threshold values and other threshold logic can be used in the above processing.

It will also be recognized by one of ordinary skill in the art that where the exemplary method uses two flight models any number of MOF models may be used with the technique of the present invention. For example, a third model may be used that predicts an accelerating vertical MOF. Any number of MOF models may be used to interactively arrive at the best determination of the actual MOF of the aircraft. Alternatively, a single model may also be used without interaction from any other model.

The VMI value is used in a process carried out by an APP as will be described below in conjunction with FIGS. 5 and 5A to provide a more rapid indication of a change in vertical MOF from level to non-level or vise-versa.

FIGS. 5 and 5A are a series of flow diagrams illustrating a process performed by an APP for determining a change in vertical mode of flight that uses the VMI value.

The exemplary modified APP method uses the two state VMI output 42 (FIG. 3) from the VMD 29 (FIG. 3) as well as the Mode C altitude data 36 (FIG. 3) and the MRT Altitude Rate data 46 (FIG. 3) to compute altitude and altitude rate information provided at ports 28c, 28d. It should be appreciated that the conventional APP is logically OR'd with the modified APP and that the VMI is just one element of the modified APP.

Generally, where either the conventional APP method or the VMI value 42 indicate a non-level flight, the modified APP method produces a non-level output. Thus, the first of either the conventional APP or the VMI value 42 to indicate a non-level MOF will cause the state predicted by the modified APP method to be non-level. In most instances of slow vertical motion below 500 ft/min, the VMI value 42 will indicate non-level flight before the conventional APP. Once a non-level MOF has been determined, then the first of the conventional APP or the VMI value 42 to indicate a level MOF will cause the modified APP method to indicate a level flight output.

In operation, when going from level to non-level flight, the APP 30 is interrogated without input from the VMD 29. If the APP 30 indicates that non-level flight is occurring, then a conclusion that the aircraft is in non-level flight is made. If, on the other hand, the APP 30 provides an indication that the aircraft is in level flight, then a check is made using the VMD input to the APP. If the APP 30 indicates level flight even with the VMD input then a decision is made that the aircraft is in level flight. If on the other hand, the APP indicates level flight without the VMD input and indicates non-level flight with the VMD input then the APP decision with VMD input overrides the APP decision without VMD input and a decision is made that non-level flight is occurring. Similarly, when going from non-level flight to level flight, the APP is interrogated without VMD input. If the APP indicates that the flight is level, then a conclusion is made that the flight is level. If, on the other hand, the APP says the flight is non-level, then a check is made using the VMD input to the APP. If the APP with the VMD input indicates that the flight is level, then a conclusion is made that the flight is level.

In particular, the exemplary modified APP method will produce an indication of a change to non-level flight track output if: (1) the VMD level flight probability is below ten percent, as indicated by the VMI output 42 taking a first state of two such states, and the previous altitude rate propagated by the conventional APP indicated level flight; (2) the initial altitude rate, set to ninety percent of the reference speed below, is greater than 200 feet per minute, where:

reference speed=(altitude reported by Mode C−reference altitude)divided by(altitude report time−reference altitude time);

and (3) the difference between the current and reference altitude is greater than 100 feet and the difference between their times is at least 3 seconds.

The exemplary modified APP method will produce an indication of a change to a level fight track output if one of the following three conditions is true: (1) The altitude rate received from the MRT is less than $10^{-6}$ nautical miles per second. (2) the level altitude reference (LAR) has not been updated for at least the last sixty five seconds; and (3) the VMD level fight probability is above fifty percent, as indicated by the VMI output 42 taking a second state of two such states, for at least forty seconds. It should be understood that both the modified APP and the conventional APP are used when going from non-level to level flight. The conventional APP is indicated implicitly by virtue of the fact that conditions (1) and (2) are those of the conventional app and conditions (3) is of the modified APP.

Thus, the level flight track is not changed to non-level unless the level MOF model probability 71 falls to ten percent. A non-level fight track is not changed to a level flight track unless the level MOF model probability 62 rises to fifty percent and stays there for at least forty seconds. There is no generation of a change in flight path indication, i.e. change of VMI state, if the probability of the VMD is between ten and fifty percent.

As has been indicated earlier, the level MOF model is interactive with a non-level MOF model. It will be recognized to one of ordinary skill in the art that where the exemplary modified APP method above makes use of two MOF models 64, 66, the exemplary VMD method using more than two models may be used as well. It will also be recognized by one of ordinary skill in the art that other probabilities and other time delays may be used in the modified APP method without changing the spirit of the invention. It should, however, also be appreciated, that the conventional APP, which does not rely on MOF model probability, can also indicate a transition, if it arrives at a determination prior to (or "beats") the modified APP.

With this particular arrangement, the exemplary VMD method used in conjunction with the conventional MRT process and the modified APP method reduces the time delay for reporting a vertical MOF change. The time delay is reduced to approximately forty seconds in typical flight path scenarios. In the present ATC system, which employs only the MRT and conventional APP method, the time delay can typically be as much as one hundred seconds. For most flight paths of vertical motion below 500 ft/min, the VMD method is the first to indicate a change in the flight path from level to non-level. Thus, the VMD process reduces the ATC time delay for recognition of MOF changes. The time delay in the determination of level or non-level change is a critical consideration in preventing collisions between aircraft. By reducing the time delay, utilization of the VMD process enhances the safety of air traffic. The time delay is also a factor in determining the safe separation between aircraft. Utilization of the VMD process, which allows shorter time delay in the determination of vertical changes in flight path, can reduce the safe separation and also increase the runway utilization.

Turning now to FIGS. 5 and 5A, processing beings in decision block 80 where a determination is made as to whether the VMI indicates a non-level mode of flight. If the VMI does not indicate a non-level mode of flight, then a loop is performed and decision block 80 is repeated. If in decision block 80 it is determined that the VMI indicates a non-level mode of flight, then processing proceeds to block 82 in which a determination is made as to whether the APP previously indicated a zero rate.

If the APP previously indicated a zero rate, then processing proceeds to block 84 where a determination is made as to whether an initial altitude rate is computable. If an initial altitude rate is not computable, then processing proceeds to block 86 where the MRT rate estimate is used and processing ends.

If on the other hand an initial altitude rate is computable, then processing proceeds to block 88 where the Mode C data is used to calculate an initial altitude rate. Processing then proceeds to block 90 where a decision is made as to whether the difference between the Mode C altitude data and the reference altitude is less than or equal to 100 feet. If it is determined that the difference is greater than 100 feet, then processing proceeds to block 92 where the calculated initial rate estimate is used and processing then ends as shown.

If on the other hand in block 90 a decision is made that the difference between the Mode C altitude data and the reference altitude is less than or equal to 100 feet, then processing proceeds to block 94 where it is determined whether an initial altitude rate is less than 200 feet per minute. If the initial altitude rate is not less than 200 feet per minute, then processing flows back to block 92 where the calculated initial rate estimate is used and processing then ends.

If on the other hand the initial altitude rate is less than 200 feet per minute, then to processing proceeds to block 96 in which the initial altitude rate is set equal to 250 feet per minute and then block 98 where a non-level mode of flight is declared.

If in decision block 82 it was determined that the APP did not previously indicate zero rate, then processing proceeds to step 100 (FIG. 5A) where a determination is made as to whether the altitude rate from the MRT is less than or equal to $10^{-6}$ nautical miles per second (nm/sec). If it is determined that the altitude rate from the MRT is less than or equal to $10^{-6}$ nm/sec, then processing proceeds to blocks 108 and 110 where the altitude rate is set to zero and a level mode of flight is declared as shown. Processing then ends.

If in decision block 100 decision is made that the altitude rate from the MRT is greater than $10^{-6}$ nm/sec then processing proceeds to decision block 102 where it is determined whether the LAR has been the same for at least 65 seconds. If the LAR has been the same for at least 65 seconds, then processing again proceeds to block 108 and 110 as described above.

If on the other hand the LAR has not been the same for at least 65 seconds, the processing proceeds to block 104 where a determination is made as to whether the VMI indicates level mode of flight for at least 40 seconds. If the VMI indicates level mode of flight for at least 40 seconds, then processing again proceeds to blocks 108 and 110 as described above.

If on the other hand the VMI does not indicate level mode of flight for at least 40 seconds, then processing proceeds to step 106 where the MRT rate estimate is used. Processing then ends.

Having described the preferred embodiments of the invention, it will now become apparent to one of ordinary skill in the art that other embodiments incorporating their concepts may be used. It is felt therefore that these embodiments should not be limited to disclosed embodiments but rather should be limited only by the spirit and scope of the appended claims.

What is claimed is:

1. A method for estimating when a moving object's vertical mode of flight changes between level and non-level, the method comprising:
    calculating a vertical motion indicator (VMI) value that indicates that the moving object's vertical mode of flight is either level or non-level; and
    utilizing the VMI value to estimate the moving object's vertical mode of flight.

2. The method of claim 1, wherein calculating the VMI value comprises:
    providing a vertical motion model that assumes one of a level mode of flight and a non-level model of flight;
    computing a probability value that indicates whether the vertical motion model matches the mode of flight of the object; and
    thresholding the probability value with one or more threshold values to produce the VMI value.

3. The method of claim 2 wherein thresholding the probability value comprising thresholding the probability value with first and second threshold values to produce a VMI value.

4. The method of claim 2, wherein the vertical motion model:
    assumes a positional state vector that includes an altitude value and an altitude rate of change value equal to zero.

5. The method of claim 4, wherein computing the probability value comprises:
    providing altimeter altitude data values;
    processing the positional state vector and the altimeter altitude data values to determine the probability value; and
    processing the positional state vector and the altimeter altitude data values to update the positional state vector.

6. The method of claim 5, wherein utilizing the VMI value comprises:
    providing the VMI value to a processor;
    providing multi-radar tracking data to the processor;
    providing the altimeter altitude data values to the processor; and
    processing the VMI value, the multi-radar tracking data, and the altimeter altitude data values in the processor to estimate the moving object's vertical mode of flight.

7. The method of claim 1, wherein calculating the VMI value comprises:
    providing a first vertical motion model that assumes a level mode of flight;
    providing a second vertical motion model that assumes a non-level mode of flight;
    computing a first probability value that indicates whether the first vertical motion model matches the object's vertical mode of flight;
    computing a second probability value that indicates whether the second vertical motion model matches the object's vertical mode of flight;
    thresholding the first probability value with first and second threshold values to produce a VMI value;
    processing the first and second probabilities to produce a weighting function; and
    utilizing the weighting function to update the first and second motion models.

8. The method of claim 7, wherein providing a first vertical motion model comprises:
    assuming a first positional state vector that includes an altitude value and a first altitude rate of change value equal to zero.

9. The method of claim 8, wherein computing the first probability value comprises:
    processing the first positional state vector and the altimeter altitude data values to determine the first probability value.

10. The method of claim 9, wherein providing a second vertical motion model comprises:
    assuming a second positional state vector that includes the altitude value and a second altitude rate.

11. The method of claim 10, wherein computing the second probability value comprises:
    processing the second positional state vector and the altimeter altitude data values to determine the second probability value.

12. The method of claim 11, wherein utilizing the VMI value comprises:
    providing the VMI value to a processor;
    providing multi-radar tracking data to the processor;
    providing the altimeter altitude data values to the processor; and
    processing the VMI value, the multi-radar tracking data, and the altimeter altitude data values in the processor to estimate the moving object's vertical mode of flight.

13. The method of claim 12, wherein processing to estimate the moving object's vertical mode of flight comprises:
    processing the VMI value, the multi-radar tracking data, and the altimeter altitude data values in the processor to estimate a non-level mode of flight of the moving object.

14. The method of claim 13, wherein processing to estimate a non-level mode of flight comprises:

providing a first value equal to the VMI value;
providing a second value equal to a vertical rate constant;
providing a third value, that indicates whether a scaled altitude rate is greater than the second value, where the scaled altitude rate is defined by, the scaled altitude rate=a multiplier constant×(the altitude data value−a reference vertical position)/((a report time of the altitude value)−(a time of the reference vertical position));

and combining the first and the third values to produce a fourth value that indicates a non-level mode of flight of the moving object.

15. The method of claim 14, wherein processing to estimate the moving object's vertical mode of flight further comprises:

processing the VMI value, the multi-radar tracking data, and the altimeter altitude data values in the processor to estimate a level mode of flight of the moving object.

16. The method of claim 15, wherein processing to estimate a level mode of flight comprises:

providing a fifth value that indicates whether the multi-radar tracking data indicates an altitude rate less than or equal to a first velocity value;

providing a sixth value equal to a reference altitude;

providing a seventh value that indicates whether the reference altitude has not been updated for at least a first time value;

providing an eighth value that indicates whether the first value has indicated a level mode of flight for at least a second time value; and combining the fifth, seventh, and eighth values to produce a ninth value that indicates a level mode of flight of the moving object.

17. The method of claim 1, wherein utilizing the VMI value comprises:

providing the VMI value to a processor;
providing multi-radar tracking data to the processor;
providing altimeter altitude data values to the processor; and
processing the VMI value, the multi-radar tracking data, and altimeter altitude data values in the processor to estimate the moving object's vertical mode of flight.

18. An apparatus for estimating when a moving object's vertical mode of flight changes between level and non-level, comprising:

a VMD processor that computes a vertical motion indicator (VMI) value that indicates that the moving object's vertical mode of flight is either level or non-level; and a flight mode processor that utilizes the VMI value to estimate the moving object's vertical mode of flight.

19. The apparatus of claim 18, wherein the VMD processor comprises:

a probability processor that utilizes a vertical motion model to compute a probability value that the vertical motion model matches the object's vertical mode of flight; and a threshold processor, coupled to the probability processor, for receiving the probability value and comparing the probability value to one or more threshold values to produce the VMI value.

20. The apparatus of claim 19, wherein the threshold processor compares the probability value with first and second threshold values to produce the VMI value.

21. The apparatus of claim 20, wherein the flight mode processor utilizes:

the VMI value, multi-radar tracking data, and the altimeter altitude data to estimate the moving object's vertical mode of flight.

22. The apparatus of claim 21, wherein the first probability processor comprises:

a first state vector processor that assumes a first positional vector state that includes an altitude value and an altitude rate of change value equal to zero;

an altimeter data processor for providing altimeter data values; and a first likelihood processor coupled to the state vector processor and the altimeter data processor for determining a first probability that the first positional state vector is true.

23. The apparatus of claim 22, wherein the flight mode processor utilizes:

the VMI value, multi-radar tracking data, and the altimeter altitude data to estimate the moving object's vertical mode of flight.

24. The apparatus of claim 23, wherein the non-level mode processor further utilizes:

a first value equal to the VMI value;
a second value equal to a vertical rate constant;
a third value, that indicates whether a scaled altitude rate is greater than the second value, where the scaled altitude rate is defined by, the scaled altitude rate=a multiplier constant×(the altitude data value−a reference vertical position)/((a report time of the altitude value)−(a time of the reference vertical position));

and a fourth value combined from the first and the third values that indicates a non-level mode of flight of the moving object.

25. The apparatus of claim 19, wherein the probability processor comprises:

a state vector processor that assumes a positional vector state that indicates an altitude value and an altitude rate of change value equal to zero;

an altimeter data processor for providing altimeter data values;

a likelihood processor coupled to the state vector processor and the altimeter data processor for determining a probability that the positional state vector matches the object's mode of flight; and an update processor coupled to the altimeter data processor and the state vector processor for updating the first altitude data value.

26. The apparatus of claim 18, wherein the VMD processor comprises:

a first probability processor that utilizes a first vertical motion model to compute a first probability value that the first vertical motion model matches the target's mode of flight;

a second probability processor that utilizes a second vertical motion model to compute a second probability value that the second vertical motion model matches the target's mode of flight;

a first threshold processor, coupled to the first probability processor, for receiving the first probability value and comparing the first probability value to first and second threshold values to produce a first compare value;

a weighting function processor, coupled to the first and the second probability processor, for receiving the first and second probability values and computing a weighting function that indicates the relative likelihood of each vertical motion model matching the target's mode of flight; and an update processor, coupled to the first and second vertical motion models, for receiving the weighting function and updating the first and second vertical motion models.

27. The apparatus of claim 26, wherein the second probability processor comprises:

a second state vector processor that assumes a second positional state vector that includes an altitude value and an altitude rate of change value equal to a rate constant; and a second likelihood processor coupled to the state vector processor and the altimeter data processor for determining a second probability that the second positional state vector is true.

28. The apparatus of claim 27, wherein:

the altimeter altitude data corresponds to data provided by at least one of:
(a) an altimeter and transponder located on the moving object; and
(b) a global positioning system (GPS).

29. The apparatus of claim 18, wherein the flight mode processor comprises:

a non-level mode processor that utilizes the VMI value, multi-radar tracking data, and altimeter altitude data to estimate a non-level mode of flight of the moving object; and a level mode processor that utilizes the VMI value, the multi-radar tracking data, and the altimeter altitude data to estimate a level mode of flight of the moving object.

30. The apparatus of claim 29, wherein the level mode processor further utilizes:

a fifth value which indicates whether the multi-radar tracking data indicates an altitude rate less than or equal to a first velocity value;

a sixth value equal to a reference altitude;

a seventh value which indicates whether the reference altitude has not been updated for at least a first time value;

an eighth value which indicates whether the first value has indicated a level mode of flight for at least a second time value; and a ninth value combined from the fifth, seventh, and eighth values that indicates a level mode of flight of the moving object.

* * * * *

UNITED STATES PATENT AND TRADEMARK OFFICE
CERTIFICATE OF CORRECTION

PATENT NO. : 6,604,028 B2
DATED : August 5, 2003
INVENTOR(S) : Dan Varon

It is certified that error appears in the above-identified patent and that said Letters Patent is hereby corrected as shown below:

Column 2,
Line 55, reads "vise-" and should read -- vice --.

Column 5,
Line 10, reads "of course" and should read -- , of course, --.

Column 10,
Line 14, reads "our" and should read -- or --.

Column 11,
Line 46, reads "sixty five" and should read -- sixty-five --.
Line 53, reads "app" and should read -- APP --.

Column 12,
Line 29, reads "beings" and should read -- begins --.
Line 62, reads "then to" and should read -- then --.

Signed and Sealed this

Tenth Day of August, 2004

JON W. DUDAS
*Acting Director of the United States Patent and Trademark Office*